May 9, 1961 J. NEUKIRCH 2,983,154
VARIABLE SPEED MECHANICAL TRANSMISSION
Filed Aug. 21, 1957 8 Sheets-Sheet 1

INVENTOR.
Johannes Neukirch
BY
Jones, Darby & Robertson
Attys.

May 9, 1961 J. NEUKIRCH 2,983,154
VARIABLE SPEED MECHANICAL TRANSMISSION
Filed Aug. 21, 1957 8 Sheets-Sheet 2

INVENTOR.
Johannes Neukirch

May 9, 1961 J. NEUKIRCH 2,983,154
VARIABLE SPEED MECHANICAL TRANSMISSION
Filed Aug. 21, 1957 8 Sheets-Sheet 3

Fig. 4.

INVENTOR.
Johannes Neukirch
BY
Jones, Darby + Robertson
Att'ys.

May 9, 1961  J. NEUKIRCH  2,983,154
VARIABLE SPEED MECHANICAL TRANSMISSION
Filed Aug. 21, 1957  8 Sheets-Sheet 4

INVENTOR.
Johannes Neukirch
BY
Jones, Darby & Robertson
Attys.

May 9, 1961 J. NEUKIRCH 2,983,154
VARIABLE SPEED MECHANICAL TRANSMISSION
Filed Aug. 21, 1957 8 Sheets-Sheet 5

Fig. 7

INVENTOR.
Johannes Neukirch
BY
Jones, Darbo & Robertson
Att'ys.

May 9, 1961  J. NEUKIRCH  2,983,154
VARIABLE SPEED MECHANICAL TRANSMISSION
Filed Aug. 21, 1957  8 Sheets-Sheet 7

Fig. 9.

INVENTOR.
Johannes Neukirch
BY
Jones, Darby & Robertson att'ys

May 9, 1961 J. NEUKIRCH 2,983,154
VARIABLE SPEED MECHANICAL TRANSMISSION
Filed Aug. 21, 1957 8 Sheets-Sheet 8

INVENTOR.
Johannes Neukirch
BY
Jones, Darby & Robertson
Att'ys.

United States Patent Office 2,983,154
Patented May 9, 1961

2,983,154

VARIABLE SPEED MECHANICAL TRANSMISSION

Johannes Neukirch, Holzweg 18, Bad Durkheim, Pfalz, Germany, assignor of one-half to Lora H. Neukirch, Park Ridge, Ill.

Filed Aug. 21, 1957 Ser. No. 679,388

6 Claims. (Cl. 74—117)

This invention relates to variable speed mechanical transmissions, and more particularly to a gear transmission employing an oscillating mechanism; specifically, a system of oscillating cranks operating through a system of overriding clutches, to drive the output shaft with maximum uniformity, means being provided to vary the amplitude of oscillation for the purpose of varying the ratio of output to input rotational speeds.

The object of the invention is to provide a positively driven power transmission mechanism which is simple in construction and wherein the ratio of the speed of the output shaft to that of the input shaft may be steplessly varied from zero to a predetermined maximum ratio and the rotation of the output shaft is practically uniform at all speeds.

A further object is to provide such a variable speed transmission which is immediately responsive to even very small increments of adjustment of the speed ratio control mechanism whereby the transmission is peculiarly adapted for use in control systems wherein output shaft speed is related to a condition to be continuously transmitted to the speed ratio control mechanism and controlled.

Another object is to provide a positive drive variable speed transmission which is capable of heavy duty without failure.

More specifically stated with respect to the drive mechanism, a primary object of the invention is to provide extremely simple means for converting the simple harmonic motion ordinarily characteristic of eccentric drives to uniform motion applied to the output shaft during driving engagement of the crank with the output shaft.

An additional objective is to provide accurate and positive means for adjusting and maintaining the output/input speed ratio.

Exemplary embodiments of the invention are shown and described with reference to the accompanying drawings, in which—

In the transmission herein shown and described, a drive mechanism is employed wherein an eccentric driven in revolution by the input shaft in turn drives a system of cranks in rotary oscillation, this oscillating motion being reconverted to unidirectional rotary motion of the output shaft by means of overriding or one-way clutches. By adjusting the degree of eccentricity of the driving eccentric, the amplitude and velocity of motion of the cranks is adjusted to consequently adjust the ratio of speeds of output to input shafts. It has been discovered that practically uniform rotation of the output shaft can be achieved by providing a substantially linear crank arm face to serve as the eccentric cam follower, the length of the moment arm changing constantly in harmony with the oscillation of the crank as will be more fully understood as the following description proceeds. To achieve this desired uniformity of motion of the output shaft, the driving eccentric must be revolved in a direction such that the line of contact of the eccentric with the linear follower face of the crank moves in a direction away from the distal end of the crank arm toward the crankshaft axis during the power stroke of the crank.

Proceeding with the detailed description of the invention, reference is first made to Figs. 1–6 of the drawings illustrating a representative embodiment thereof. For preliminary comprehension purposes, the primary functional elements and the mode of operation thereof will first be described and the detailed description of other elements provided for the proper operation of the transmission will follow.

Figure 4:
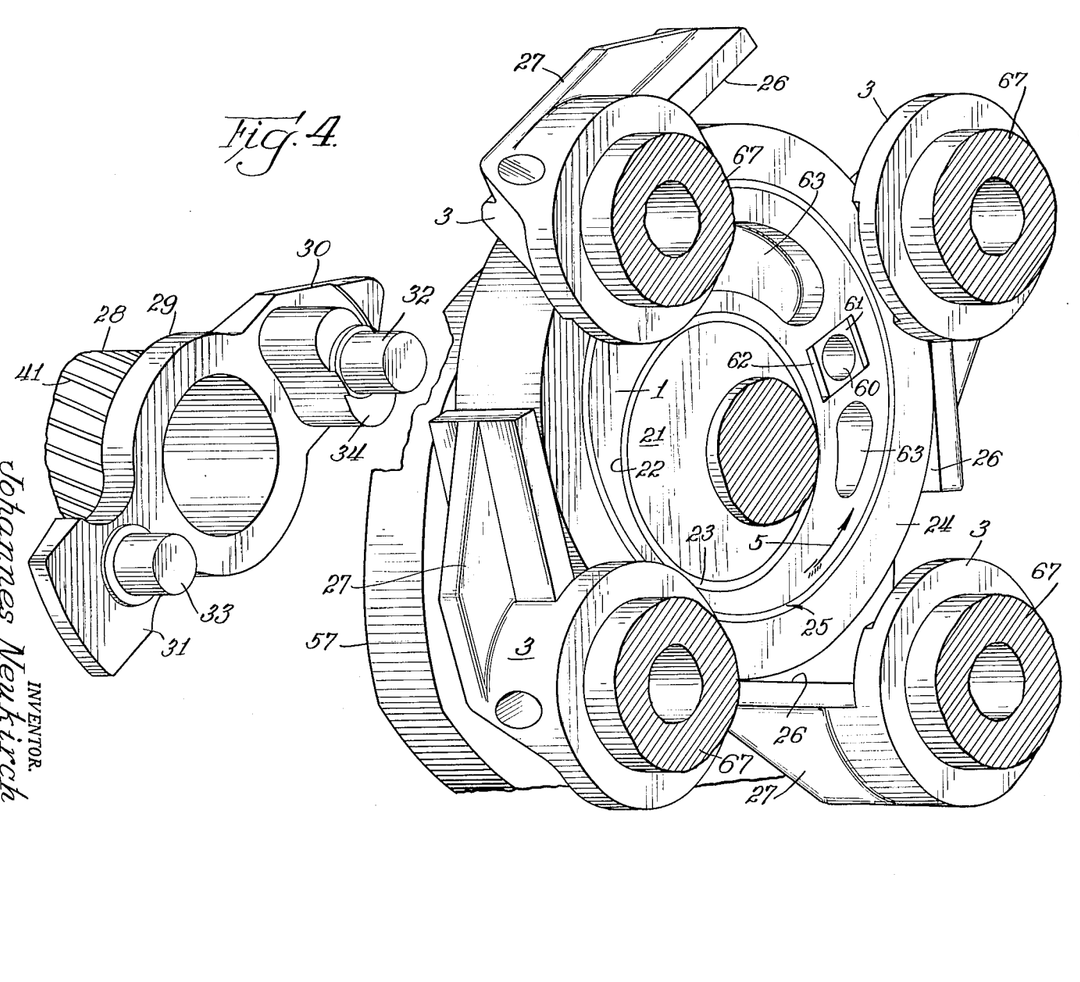
Fig. 4 is an exploded view showing the eccentric drive and crank assembly.

A plate eccentric 1, sometimes functionally referred to as the working or driving eccentric or merely "eccentric," driven in rotation by input shaft 2 and intervening mechanism, drives four cranks 3 in rotary oscillation when the eccentric is in eccentric position with respect to the axis of shaft 2. The degree of eccentricity is adjustable to correspondingly determine the amplitude of oscillation of the cranks and thus the rotational speed ratio of output shaft 4 to input shaft 2. For reasons hereinafter explained, the direction of rotation of eccentric 1 must be that shown by arrow 5 (Fig. 4). Through overriding clutches, indicated generally at 6, meshing with gear 7 keyed on output shaft 4, continuous, unidirectional and substantially uniform rotation is imparted to the output shaft.

Figure 1:
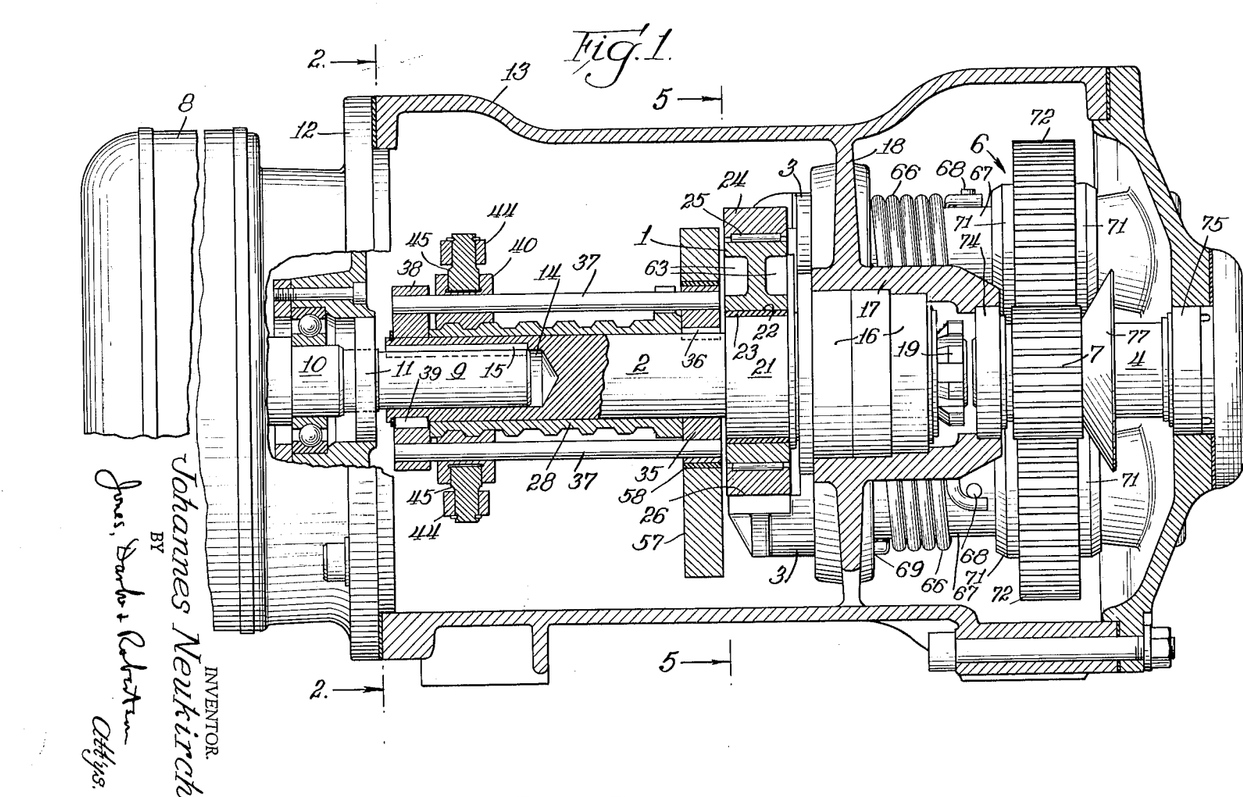
Fig. 1 is a longitudinal view, in cross-section, of a preferred form of the transmission with a driving motor mounted at the input end thereof.

An electric motor 8 having a drive shaft 9 journalled in the motor housing at 10 and provided with an oil seal 11 is bolted by motor housing flange 12 to the inlet end of transmission casing 13. Motor shaft 9 extends a substantial extent into an axial bore 14 in transmission input shaft 2 and is keyed to the input shaft at 15. The inner end of input shaft 2 is journalled in heavy duty bearings 16 securely mounted in part 17 of the transmission housing structure which forms an integral part of housing 13, being supported by a transverse wall 18. The input shaft is held in proper axial position by a suitably locked nut 19 threaded upon the end of the shaft.

An enlarged portion 21, preferably formed as an integral part of input shaft 2, has a circular periphery but is eccentric with respect to the axis of the input shaft, forming a fixed eccentric which rotates with the input shaft. Eccentric 1, having an eccentric bore 22, surrounds fixed eccentric or circular cam 21, a suitable bushing 23 being interposed as shown, if desired, to provide a snug but movable fit. Eccentric 1 is, in turn, surrounded by a ring 24 having a concentric race containing roller bearings 25 which permit ring 24 to rotate freely with respect to eccentric 1. So far as the drive motion is concerned, ring 24 may be considered to be a part of eccentric 1. Since the periphery of ring 24 provides the bearing surface for the working faces 26 of arms 27 of cranks 3, at least the inner and outer surfaces of ring 24 should be hard to resist wear.

The mechanism for adjusting and maintaining the relative rotational position of eccentric 1 upon fixed (with respect to input shaft 2) circular cam 21 and for driving the eccentric in rotation with input shaft 2 will now be described. A sleeve 28 fits snugly but movably on input shaft 2 and carries at its inner end, desirably as an integral part thereof, a cross member 29 (Fig. 4) having arms 30 and 31. Arm 30 carries a pin 32 and arm 31 carries a pin 33, these pins extending in a direction parallel to the axis of the sleeve 28 and the input shaft of the transmission. For reasons that will presently be understood, pin 32 is longer than pin 33 and is provided with a base 34 for strengthening and stiffening purposes.

A second circular cam 35 for a counterbalancing eccentric is affixed to input shaft 2 by means of a suitable key 36. A cage structure, including a pair of diametrically spaced rods 37 extending between and affixed at their ends in eccentric 35 and a ring 38 keyed at 39 upon input shaft 2 at the input end thereof, is provided for rotation with the input shaft to carry a collar 40 which encircles sleeve 28 and is axially movable along rods 37 to any position along the length of the sleeve. Collar 40 is mechanically meshed with sleeve 28 by means of a spiral spline formed by spiral splineways 41 cut in the outer surface of sleeve 28 and in the bore of collar 40. Since collar 40 is carried by rods 37 which rotate with input shaft 2, the rotative position of this collar with respect to the input shaft is the same for any position along the length of rods 37, while the rotative position of sleeve 28, and thus of arms 30 and 31 of the cross member 29, with respect to the input shaft is determined by the longitudinal position of collar 40 upon rods 37. As will be understood presently, the particular position of collar 40 along the lengths of rods 37 determines the degree of eccentricity of cam plate 1 and, therefore, the output-input speed ratio of the transmission.

Figure 2:
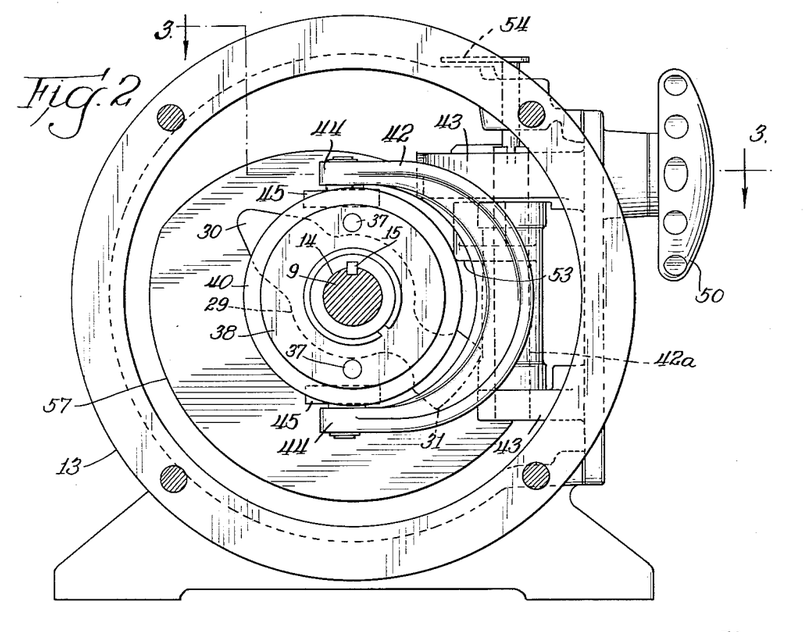
Fig. 2 is a cross-sectional view taken at the line 2—2 of Fig. 1 and showing an input end view of the transmission.
Figure 3:
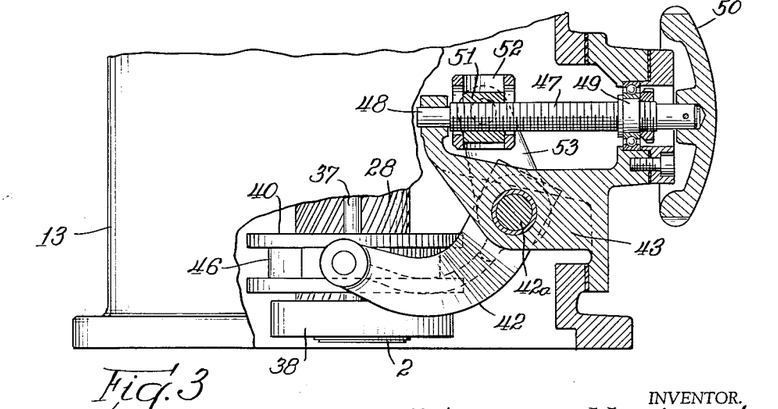
Fig. 3 is a top view, taken at the line 3—3 of Fig. 2 and partly in section, showing details of the speed ratio control mechanism.

A manually operated mechanism for controlling the position of collar 40 upon the splined sleeve 28 is best shown in Figs. 2 and 3. A yoke 42 is pivotally supported at 42a from housing structure 43 and carries at its extremities 44 a pair of shoes 45 which slidably fit in groove 46 in the periphery of collar 40. A threaded spindle 47 is journalled at 48 and 49 in fixed support 43, a hand wheel 50 being affixed to the end of the spindle which extends to the exterior of the transmission structure for turning the spindle. A nut 51 carried in a cage 52 provided at the extremity of a lever arm 53 of yoke 42 is threaded upon spindle 47 with provision for clearance as the spindle is turned by manipulation of wheel 50 to move nut 51 along the spindle and thus rotate yoke 42 about pivot 42a. A pointer 54 may be attached to an end of the pin of pivot 42a extended to the exterior of transmission housing 13 to indicate on a suitable scale the position of collar 40 and thus the speed ratio of the transmission at any setting.

It will be understood from the foregoing description that the turning of wheel 50 results in the movement of collar 40 along the length of rods 37, such movement causing rotation of sleeve 28 and cross member 29 with respect to collar 40 and input shaft 2 by reason of the spiral spline coupling of collar 40 and sleeve 28.

A counterbalancing eccentric 57 is arranged to surround fixed eccentric 35, a suitable bushing 58 being interposed to provide a snug but movable fit between these parts. While eccentric 35 is keyed to rotate with input shaft 2, counterbalance eccentric 57 may be rotated within limits with respect to eccentric 35, the rotative position of the counterbalance being determined, as in the case of working eccentric 1, by the position of collar 40 controlling the rotative position of sleeve 28 and cross member 29. The connection is provided by pin 33 which extends into an opening 57a in counterbalancing eccentric 57, thus establishing a driving relationship between arm 31 of cross member 29 and the counterbalancing eccentric. This opening is somewhat elongated in a radial direction to permit clearance for all permitted rotational positions of sleeve 28. Pin 32, including its stiffening base 34, extends through a curved slot 59 provided for the purpose in fixed counterbalance eccentric 35 and into a hole 60 in a radially elongated slot 62 in cam plate 1. Elongation of this slot is provided for necessary clearance for the limits of position of eccentric 1 upon fixed eccentric 21. Indentations 63 are provided only to reduce the weight of eccentric 1.

From the foregoing, it will be understood that cross member 29 and associated mechanical elements serve both to drive and to control the degree of eccentricity of working eccentric 1 and counterbalancing eccentric 57. As will be seen from Figs. 1, 2 and 4, rotation of sleeve 28, carrying cross member 29, with respect to input shaft 2 is limited to an angle of about 90 degrees. At one extreme position, such as that shown in Figs. 1 and 2, and indicated in Fig. 6, both the working and counterbalancing eccentrics are in positions of maximum eccentricity, while at the other extreme, indicated in Fig. 5, eccentricity is zero.

Figure 5:
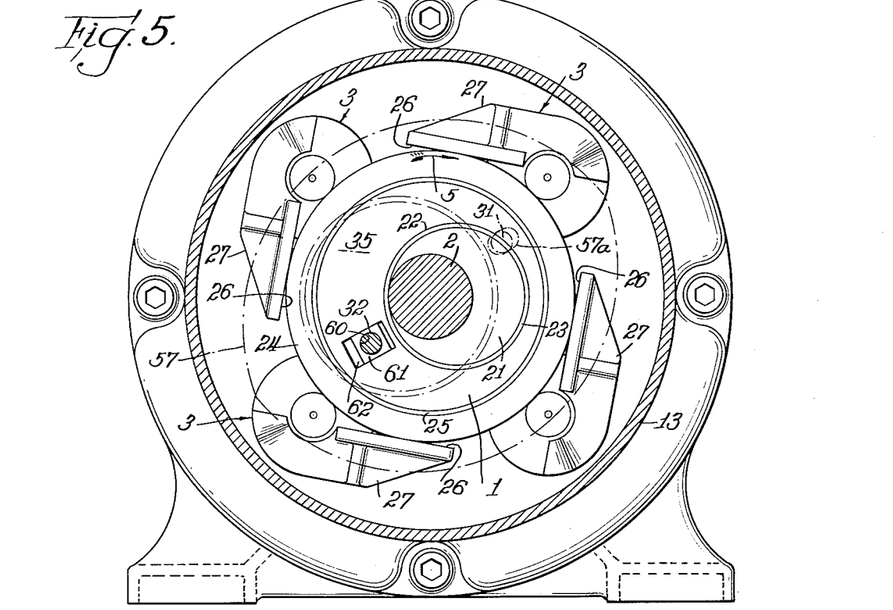
Fig. 5 is a cross-sectional view taken at the line 5—5 of Fig. 1 and showing the drive eccentric at zero eccentricity, the counterbalancing assembly being shown in dot-dash lines.
Figure 6:
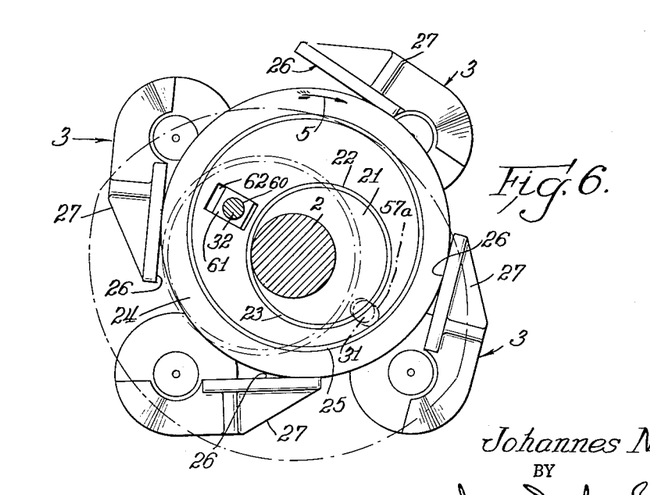
Fig. 6 is a cross-sectional view showing the mechanism of Fig. 5 with the drive eccentric set at maximum eccentricity, the counterbalance assembly being shown in dot-dash lines.

To properly counterbalance the working eccentric, fixed eccentrics 21 and 35 must be oriented upon input shaft 2 with their eccentricities in diammetrically opposite directions from the axis of the input shaft. This arrangement is shown in Figs. 5 and 6 wherein the counterbalance eccentrics, both the fixed eccentric 35 and the outer plate 57, are shown in dot-dash lines.

The broadened extremity of arm 31 is designed to provide extra weight to counterbalance pin 32 and base 34.

Cranks 3 are journalled in fixed housing structure at 64 and 65. Each is provided with a linear cam follower face 26 arranged to bear against the periphery of ring 24 (Fig. 4). By "linear follower face" is meant a face on one side of the crank arm which face extends outwardly along the arm in a substantially straight line. Relatively heavy coil springs 66 encircle crank shafts 67 and their ends are anchored respectively at pins 68 affixed in the crankshafts and at 69 in fixed housing structure. These springs are biased to urge the cranks in rotation in a direction to hold the follower faces 26 in contact with the periphery of ring 24 at all times. Suitable duct means, shown in the drawing but not specially described, are provided for the circulation of lubricant to the crankshaft bearings as well as to other moving parts.

Overriding clutches 6, preferably of the sprag or cam type, are of conventional construction and include sprags arranged between retaining members 71 and operating between crankshafts 67 and the bores of gears 72. Gears 72, in turn, mesh with gear 7 keyed to output shaft 4. The output shaft is journaled in fixed housing structure at 74 and 75 and a suitable oil seal is provided to prevent leakage of oil from the transmission. An oil spreader 77, rotating with the output shaft, may be provided to assist in the proper distribution of lubricant, especially for the supply of the bearing at 75.

In the operation of the transmission, rotation of the input shaft results in angular oscillation of cranks 3, the amplitude of oscillation depending upon the degree of eccentricity of the working eccentric, including ring 24, against the periphery of which the flat working surfaces 26 of the cranks bear. When, as shown in Fig. 5, eccentricity of the working eccentric is zero, the cranks are not caused to oscillate and consequently output shaft 4 stands still. As eccentricity is increased, as shown in Fig. 6, by the turning of wheel 50 or arm 55, the amplitude of oscillation of the cranks correspondingly increases as does the ratio of speed of the output shaft to the speed of the input shaft. The upper limit of this ratio depends upon the design of the particular transmission. In Figs. 5 and 6, the dot-dash lines indicate the positions of the counterbalancing eccentric.

As is indicated in Fig. 6, the line of contact between the periphery of ring 24 and faces 26 of the cranks moves back and forth along the lengths of these faces. Angular acceleration and velocity of the cranks in rotary oscillation are not the same during the forward and return strokes of each oscillation cycle. This nonuniformity results from the constantly changing length of moment arm between the axis of the crankshaft and the point of contact of the face of the crank with the periphery of the eccentric ring as the radius from the axis of the input shaft to this point of contact changes with rotation of the working eccentric. It has been discovered that when the input shaft and associated eccentric assembly is rotated in the direction indicated by arrow 5; that is, in such a direction that the point of contact moves from the outer extremity of the crank arm inwardly toward the axis of the crankshaft during the power stroke of the crank (when the overriding clutches are operative), the cumulative result of the cam effect of the eccentric drive and the progressively decreasing length of moment arm is to impart a practically uniform velocity to that one of the cranks of the system which at any instant is moving at maximum speed in power stroke direction, with the result that, with each crank successively taking over the drive function in turn, practically uniform velocity is imparted to the output shaft. The return stroke of the crank is correspondingly uneven, but since the crank is not then coupled with the output shaft, this unevenness is of no consequence.

To insure a thorough understanding of the manner in which the transmission of the invention delivers a practically uniform speed at the output shaft, reference is made to the diagrammatic illustrations and graphs of Figs. 10-13. These analytic illustrations graphically demonstrate the characteristic motion of the novel transmission mechanism, comparing the same with the simple harmonic motion characteristic of the revolving cam plate and of known mechanisms.

Figure 10:
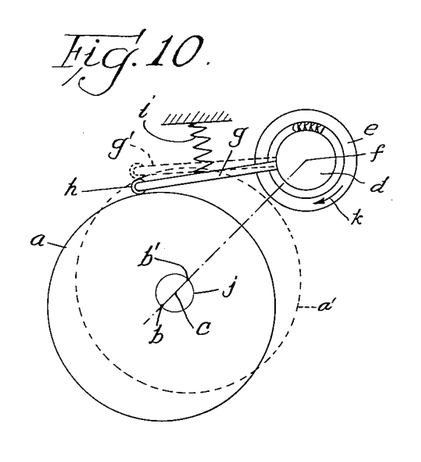
Figs. 10–13 are diagrammatic illustrations and graphs explanatory of the motion of the cranks and clutches in the operation of the transmission of the invention.
Figure 11:
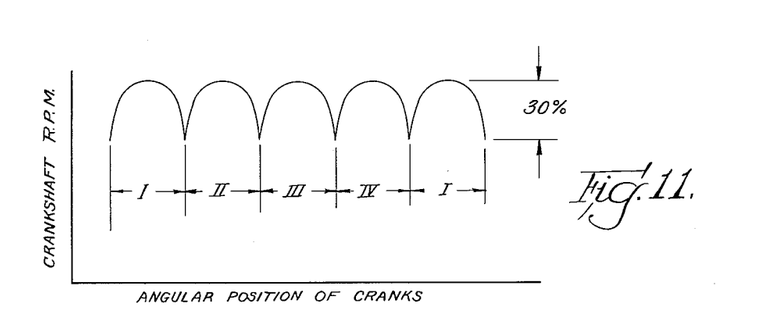

Considering, first, for purposes of comparison with the invention, the diagrammatic illustration of Fig. 10 and its associated graph, Fig. 11, the solid circle $a$ represents the periphery of the driving eccentric having a center $b$ which is eccentric with respect to the axis $c$ of the input shaft of the transmission. The crankshaft $d$, which may also serve as the clutch shaft of the overriding clutch $e$, rotationally oscillates about crankshaft axis $f$. Crank arm $g$ extends laterally from crankshaft $d$ and is provided with a roller $h$ which bears against the periphery $a$ of the working eccentric, being held in following relationship thereto by suitable means, represented by compression spring $i$. Upon rotation of the input shaft, eccentric $a$ revolves about axis $c$, the center $b$ of the cam plate travelling in circular orbit $j$ around axis $c$. In so revolving around the axis of the input shaft, the eccentric $a$ causes the crankshaft and clutch shaft $d$ to oscillate, resulting in rotation of the outer race of clutch $e$ in the direction of the arrow $k$. Circle $a'$, shown in dotted lines, indicates the position of eccentric $a$ after 180 degrees of revolution, the center being at $b'$. The corresponding position of crank arm $g$ is indicated in dotted lines at $g'$.

The oscillating movement of the crankshaft $d$ is the characteristic simple harmonic motion. Assuming that four cranks are used with a single driving eccentric, in the manner hereinabove described with reference to the transmission mechanisms, the motions of the crankshafts, and therefore, of the output shaft, are represented by the graph of Fig. 11. Each successive crank, I, II, III and IV, becomes operative in driving the output shaft through the associated overriding clutch, so that each is operative for 90 degrees or one-quarter of each revolution of the input shaft. As is indicated, this cycle is then repeated, with crank I again taking over following crank IV. In this graph, ordinates represent instantaneous rotational velocity of the respective crankshafts, and the abscissae represent instantaneous angular positions of the several cranks. As the graph shows, angular velocity is quite non-uniform, the coefficient of fluctuation (the ratio of the difference between maximum and minimum velocities during the power stroke to the maximum velocity) bring about thirty percent.

Figure 12:
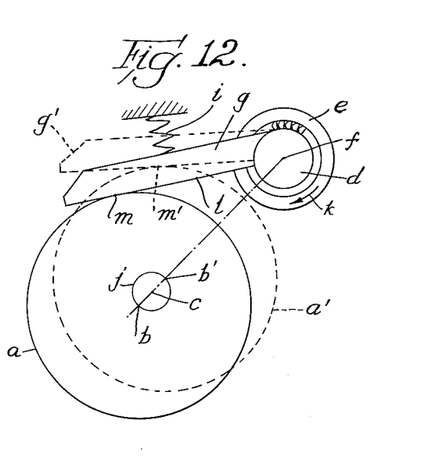

The improved drive mechanism of the invention is illustrated in the diagram of Figure 12. This illustration is identical to that of Fig. 10 with the single exception that, in place of a follower roller $h$, engagement between eccentric $a$ and follower crank arm $g$ takes place along a linear face $l$ which is held in contact with the periphery of eccentric $a$ by a compression spring $i$. As the cam plate is revolved around input shaft axis $c$, the point of contact $m$ moves back and forth along the follower face $l$, the point of contact when the working eccentric is in the dotted line position $a'$ being at $m'$. Thus, while the crank arm $g$ having the roller follower $h$ engages the periphery of eccentric $a$ at a fixed distance from the axis $f$ of the crankshaft $d$, the effective length of the crank arm $g$ of the device illustrating the invention, as shown in Fig. 12, is constantly changing in harmony with the revolution of eccentric $a$. The result is a different motion characteristic.

Figure 13:
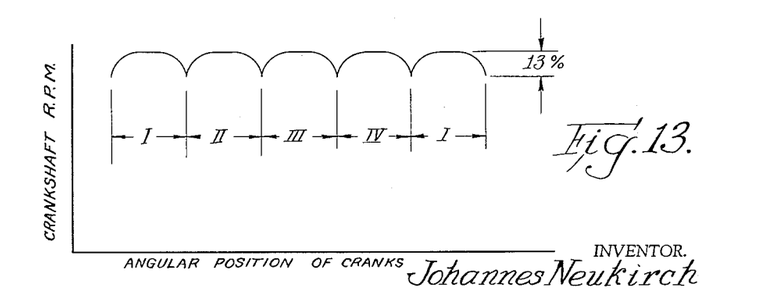

The motion characteristic of the cranks, and therefore of the output shaft, of the driving mechanism of the invention is shown graphically in Fig. 13. It will be seen that the velocity of rotation of the several cranks during the power strokes are very much more uniform. The typical graph indicates a coefficient of fluctuation of thirteen percent. As an analysis will show, this coefficient of fluctuation decreases with increased eccentricity of the driving eccentric, the graph of Fig. 13 illustrating an intermediate position comparable to the graph of Fig. 11. It can also be shown that for a given output/input speed ratio of a transmission mechanism, the degree of eccentricity of working eccentric $a$ may be slightly less when the linear follower is used than when the roller type of follower is employed.

Although, as has been shown, the speed of the output shaft of the transmission of the invention is not perfectly uniform, for most practical purposes the motion is fully satisfactory since the flywheel effect of the moving parts and other factors tend to minimize the minor irregularity still theoretically existing in the motion of the output shaft.

It may be noted that five, or even more, cranks may be employed to advantage in the drive mechanism of the transmission. Also, many modifications of parts or mechanical groups may be used, certain advantages accruing in certain instances by reason of the particular form of structure and the manner in which it operates.

Figure 8:
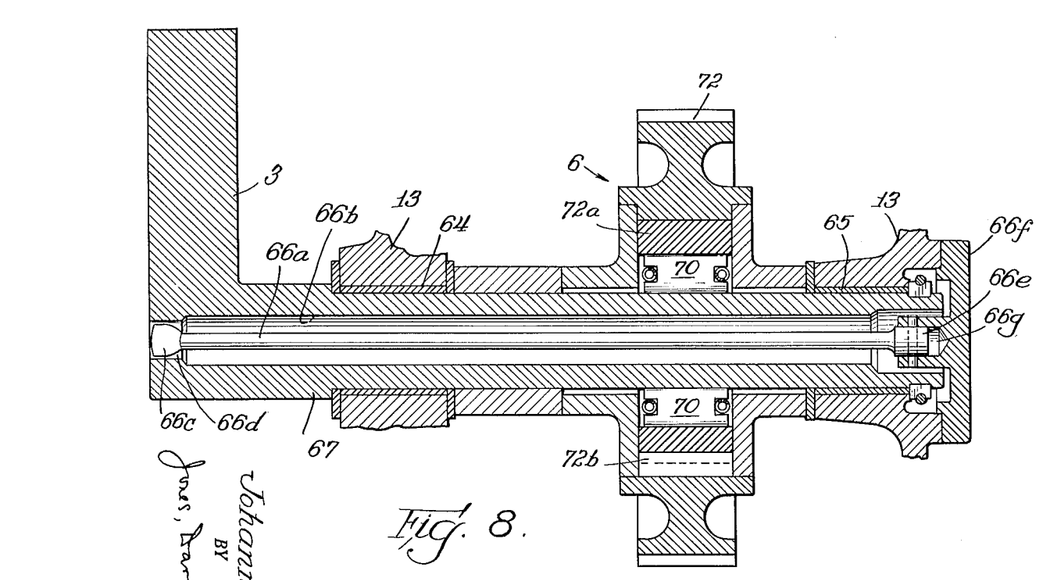
Fig. 8 is a detailed, sectional view showing an alternative form of crankshaft assembly.

In place of the helical springs 66 used in the above-described embodiment of the invention to bias or urge the crank in a direction to return the crank between power strokes and maintain the follower face of the crank in contact with the working eccentric ring, an alternative, and in some ways preferred, form of spring may be employed as shown in the alternative form of crank assembly shown in Fig. 8. A torsion bar 66a extends axially through an axial bore 66b in crankshaft 67 substantially from one end to the other of the crankshaft. The forward end 66c is flattened and rests in a slot 66d in the body of the crank. The forward end of the torsion bar is thus arranged to oscillate with the crank; that is, it is held against relative movement with respect to the crank. The rearward end 66e is affixed to a cap 66f, as by pinning this end of the torsion bar in a socket 66g integral with cap 66f, as shown. The cap may be bolted to the housing of the transmission. The torsion bar is initially stressed after assembly of the crank in the transmission by turning the cap after insertion of the flat end 66c in slot 66d and bolting the cap to the transmission housing with the torsion bar in the pre-stressed condition as required to apply the desired torque to the crank for purposes already specified.

Figure 7:
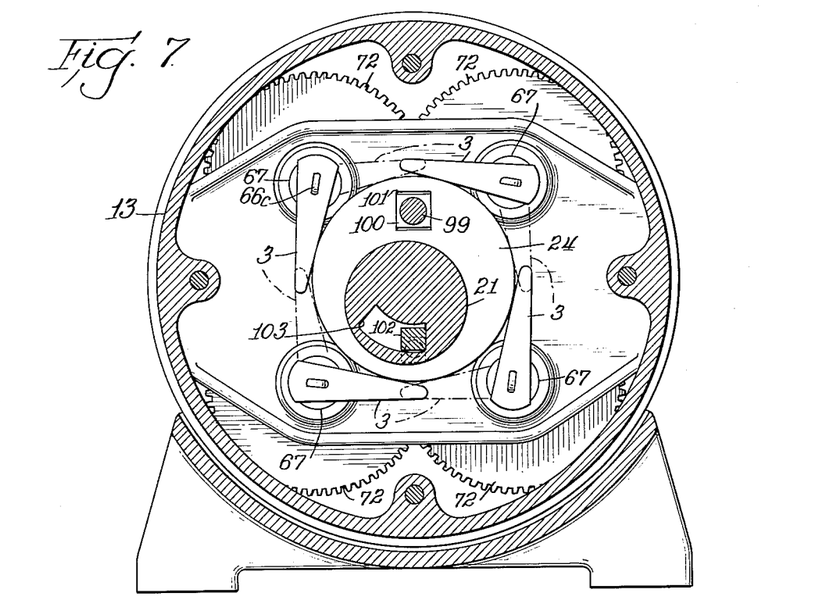
Fig. 7 is a cross-sectional view showing an alternative form of eccentric drive and crank arm assembly at zero eccentricity.

As is indicated in Fig. 7 with reference to a somewhat modified form of transmission, the cranks may be so arranged that the transmission may be used with a motor which rotates the input shaft in the opposite direction. Follower faces are provided on opposite sides of cranks 3 and they may, if desired, be oriented as shown in dot-dash lines. The clutches must also be reversed, and the torsion bars pre-stressed in the opposite direction.

Figure 9:
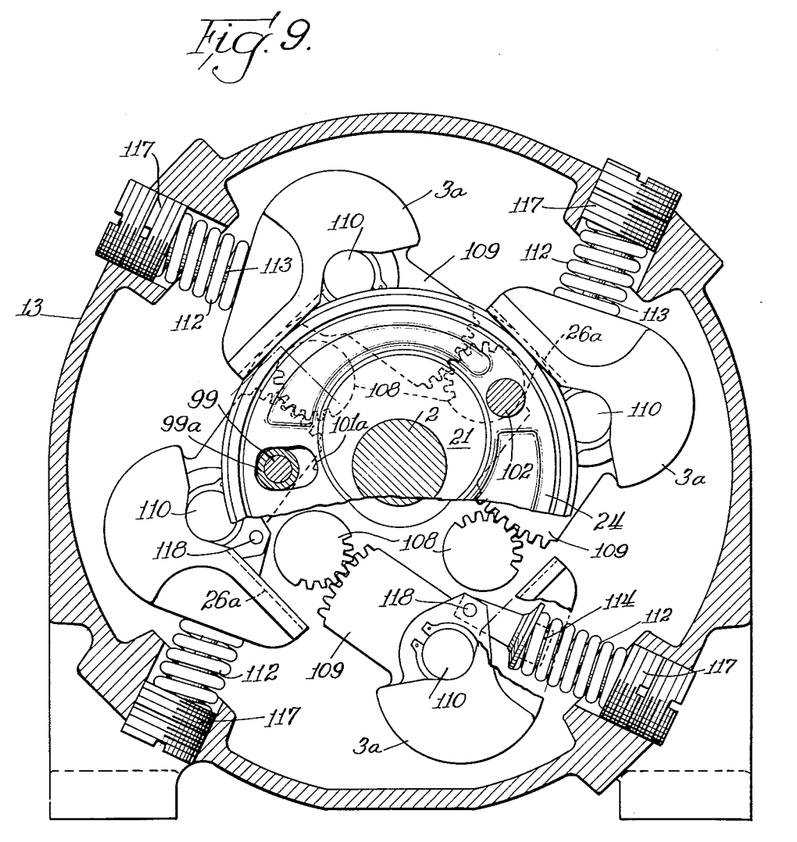
Fig. 9 is a cross-sectional view of a transmission showing an alternative form of crank.

Further possible, and in certain respects preferable, modifications are exemplified in the form of the transmission mechanism illustrated in Fig. 9. In this embodiment of the invention, oscillating motion of the cranks is transmitted to the one-way clutches through the intermediation of gear sectors integral with the cranks and pinions or segment gears keyed to the clutch shafts. Also, dynamic counterbalancing of the working eccentric assembly is provided.

A pin 99, which may carry a hardened metal sleeve 99a enters and works in a radially somewhat elongated slot 101a in working eccentric 24 for the purpose of driving the latter in rotation at the speed of input shaft 2. A second pin 102 is fixed in working eccentric 24 and is intended for driving counterbalancing eccentrics.

Four countershafts, each journaled in fixed housing structure and carrying a pinion or segment gear 108 at its inner end, is mechanically coupled to the output shaft through one-way clutches. Meshed with pinions 108 are gear segments 109 which are integral with cranks 3a. Each of the four cranks 3a has a linear face 26a which bears against outer race 111 which surrounds working eccentric 24, a suitable needle or other bearing 112 being interposed between the race and eccentric to minimize friction between these relatively rotating members. The cranks are continuously spring-biased by compression coil springs 112 to maintain continuous contact between faces 26a of cranks 3a and the outer surface of race 111. The biasing spring pressure is brought to bear by pins 113 having shoulder seats 114, the outer ends of the pins having hardened heads 115 arranged for reciprocation within bores 116 of threaded plugs 117, while the inner ends of the pins are pivoted at 118 to the cranks 3a.

It will be understood that interposition of the gearing 108, 109, with the arrangement shown, results in greater speed of the output shaft of the transmission, for a given input speed, than would be realized by driving the clutches directly from the crankshafts as in the embodiments of the transmission previously described. The countershafts oscillate with greater amplitude, for a given amplitude of oscillation of the cranks, with the result that "wind-up" losses in the clutches themselves are minimized.

For reasons of simplicity and clarity, details of bearing and similar standard mechanical elements have not been shown or described in full detail. Particular application may dictate the type of anti-friction devices used, and claims defining the essential mechanical elements will be deemed to define the structures with such auxiliary mechanical elements interposed as, for example, the use of rings or races around the driving eccentric, thus interposed between the eccentric and the follower faces of the crank arms.

Invention is claimed as follows:

1. In a mechanical transmission, a drive mechanism comprising a circular eccentric, a crank journaled for rotation about the axis thereof and having an arm having a substantially linear follower face, said crank being arranged with the axis thereof parallel to the axis of said eccentric and said follower face tangentially engaging the periphery of said eccentric, means for driving said eccentric in revolution about an eccentric axis in a direction such that the line of contact between the eccentric and the arm moves progressively toward the axis of the crank, means for maintaining said face of said crank arm continuously in engagement with said eccentric whereby said crank is caused to oscillate upon revolution of said eccentric, and means including an overriding clutch mechanically coupled with said crank for converting the rotary oscillation thereof to unidirectional rotation of a transmission output shaft, the elements of the clutch being oriented to be engaged during outward movement of the arm of said crank.

2. A drive mechanism in accordance with claim 1 and including means for adjusting and maintaining the degree of eccentricity of the eccentric whereby to adjust the amplitude and velocity of oscillation of the crank.

3. A drive mechanism in accordance with claim 1 wherein the means for maintaining the face of the crank arm in engagement with the eccentric comprises a crankshaft forming part of the crank and fixed transmission structure wherein said crankshaft is journaled, said crankshaft having an axial bore extending substantially throughout the length thereof, a torsion bar axially arranged within said bore, socket means at the inner end of said bore for receiving one end of said bar and restraining said end against rotation with respect to said crankshaft, the other end of said bar being anchored in said fixed structure.

4. A drive mechanism in accordance with claim 1 wherein the means for converting the rotary oscillation of the crank to unidirectional motion of an output shaft comprises a countershaft having the overriding clutch mechanically coupled thereto, a pinion affixed to said countershaft at one end thereof, and a gear sector extending laterally from said crank in fixed relation thereto and meshing with said pinion.

5. In a mechanical transmission, a drive mechanism comprising a circular eccentric, a plurality of cranks journaled at angularly spaced points for rotation about the respective axes thereof, each of said cranks having an arm having a substantially linear follower face, said cranks being arranged with the axes thereof parallel to the axis of said eccentric and said follower faces thereof engaging tangentially in the same direction the periphery of said eccentric, means for driving said eccentric in revolution about an eccentric axis in a direction such that the lines of contact between the eccentric and the arms of the cranks move progressively toward the axes of the cranks, means for maintaining said faces of said crank arms continuously in engagement with said eccentric whereby said cranks are caused to oscillate upon revolution of said eccentric, and means including an overriding clutch mechanically coupled with each said crank for converting the rotary oscillation thereof to unidirectional substantially uniform rotation of a transmission output shaft, the elements of the clutch being oriented to be engaged during outward movement of the arm of the associated crank.

6. A drive mechanism in accordance with claim 5 wherein the arm of each crank is provided with a second linear follower face on the side of said arm opposite the first-mentioned follower face whereby said cranks are adapted to be reversed in orientation to bring said second follower faces into engagement with the eccentric and render said drive mechanism operative with revolution of said eccentric in the opposite direction.

(References on following page)

References Cited in the file of this patent

UNITED STATES PATENTS

| | | |
|---|---|---|
| 1,875,854 | Cooper | Sept. 6, 1932 |
| 1,954,767 | Foster | Apr. 10, 1934 |
| 1,956,447 | Laessker | Apr. 24, 1934 |
| 2,067,399 | Hughes | Jan. 12, 1937 |
| 2,348,958 | Celio | May 16, 1944 |
| 2,554,463 | Klamp | May 22, 1951 |
| 2,782,881 | Roller | Feb. 26, 1957 |

FOREIGN PATENTS

| | | |
|---|---|---|
| 652,250 | France | Oct. 22, 1928 |
| 358,570 | Great Britain | Oct. 12, 1931 |
| 462,741 | Italy | Apr. 2, 1951 |
| 595,370 | Great Britain | Dec. 23, 1947 |
| 904,966 | Germany | Feb. 25, 1954 |